(12) United States Patent
Kavala

(10) Patent No.: US 11,754,037 B2
(45) Date of Patent: Sep. 12, 2023

(54) ROOT PORTION OF A WIND TURBINE BLADE FOR A WIND TURBINE, WIND TURBINE BLADE, ROOT ASSEMBLY AND WIND TURBINE

(71) Applicant: Siemens Gamesa Renewable Energy A/S, Brande (DK)

(72) Inventor: Venkateswara Rao Kavala, Karnataka (IN)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/137,508

(22) Filed: Dec. 30, 2020

(65) Prior Publication Data

US 2021/0215131 A1   Jul. 15, 2021

(30) Foreign Application Priority Data

Jan. 15, 2020   (EP) ..................... 20152000

(51) Int. Cl.
*F03D 1/06* (2006.01)
(52) U.S. Cl.
CPC ......... *F03D 1/0658* (2013.01); *F03D 1/0675* (2013.01); *F05B 2260/301* (2013.01)
(58) Field of Classification Search
CPC .... F03D 1/0658; F03D 1/0675; F03D 1/0683; F03D 1/0691; F03D 3/064; F05B 2260/301
See application file for complete search history.

(56) References Cited

U.S. PATENT DOCUMENTS 8,591,187 B2 * 11/2013 Bagepalli ................ F03D 17/00
416/1
10,077,757 B2 * 9/2018 Kannenberg .......... F03D 1/0658
(Continued)

FOREIGN PATENT DOCUMENTS

DE   102006022272 A1   11/2007
DE   102014005452 A1   10/2015
(Continued)

OTHER PUBLICATIONS

Machine translation of WO-2015154737-A1, retrieved from ESPACENET dated Oct. 6, 2022 (Year: 2022).*
(Continued)

*Primary Examiner* — Courtney D Heinle
*Assistant Examiner* — Sang K Kim
(74) *Attorney, Agent, or Firm* — Schmeiser, Olsen & Watts LLP

(57) ABSTRACT

Provided is a root portion of a wind turbine blade for a wind turbine, whereby the root portion includes multiple first bolts arranged within the root portion and extending out of a root attachment face of the root portion for attachment of the root attachment face to a bearing or a hub flange, and whereby the root portion includes multiple first connectors fixedly arranged within the root portion, wherein the multiple first bolts are connected to the root portion by the first connectors for transmission of force from the multiple first bolts to the root portion via the multiple first connectors, whereby the first connectors are arranged in a first row along the root portion and each of a multiple of second connectors is fixedly arranged within the root portion and in a second row along root portion.

9 Claims, 7 Drawing Sheets

(56) References Cited

U.S. PATENT DOCUMENTS

| | | | |
|---|---|---|---|
| 10,190,571 B2* | 1/2019 | Samudrala | F03D 1/0658 |
| 10,865,767 B2* | 12/2020 | Rubner | F03D 1/0658 |
| 2007/0231146 A1* | 10/2007 | Birkemeyer | F03D 1/0658 |
| | | | 416/204 R |
| 2009/0263250 A1 | 10/2009 | Quell et al. | |
| 2012/0148404 A1* | 6/2012 | Quell | F03D 1/0658 |
| | | | 416/1 |

FOREIGN PATENT DOCUMENTS

| | | | | |
|---|---|---|---|---|
| EP | 1840372 A2 | 10/2007 | | |
| EP | 1956235 A1 | 8/2008 | | |
| EP | 3839246 A1 * | 6/2021 | | F03D 1/0658 |
| WO | WO-2015154737 A1 * | 10/2015 | | F03D 1/0658 |

OTHER PUBLICATIONS

European Search Report and Written Opinion of the European Searching Authority dated Jul. 10, 2020 for Application No. 20152000.4.

* cited by examiner

ROOT PORTION OF A WIND TURBINE BLADE FOR A WIND TURBINE, WIND TURBINE BLADE, ROOT ASSEMBLY AND WIND TURBINE

CROSS-REFERENCE TO RELATED APPLICATIONS

This application claims priority to European Application No. 20152000.4, having a filing date of Jan. 15, 2020, the entire contents of which are hereby incorporated by reference.

FIELD OF TECHNOLOGY

The following relates to a root portion of a wind turbine blade for a wind turbine, a wind turbine blade, a root assembly and a wind turbine.

BACKGROUND

Root assemblies comprise a root portion of a wind turbine blade connected to a bearing or a hub flange of the wind turbine. Connection means or connectors are arranged within the root portion. These connection means or connectors are connected to bolts, which are secured against the bearing or hub flange of the wind turbine. When securing the bolts, the root portion is loaded resulting in a compression of the root portion and a tensile stress in the bolts. The root portion therefore is subjected to high compressive stress and further to the loads occurring during operation of the wind turbine, whereby the design options, e.g. size and type of the wind turbine blade, are limited, possibly resulting in failure and reducing service life of the wind turbine blade.

SUMMARY

An aspect relates to an improved root portion, wind turbine blade, root assembly and wind turbine not having the previously described disadvantage, in particular having a long service life.

Thereby, the features and details described in connection with the root portion of embodiments of the invention apply in connection with the wind turbine blade of embodiments of the invention, the root assembly of embodiments of the invention and with the wind turbine of the invention, so that regarding the disclosure of the individual aspects of embodiments of the invention it is or can be referred to one another.

According to a first aspect of embodiments of the invention, the aspect is solved by a root portion of a wind turbine blade for a wind turbine, whereby the root portion comprises multiple first bolts arranged within the root portion and extending out of a root attachment face of the root portion for attachment of the root attachment face to a bearing or a hub flange, and whereby the root portion comprises multiple first connection means or connectors fixedly arranged within the root portion, wherein the multiple first bolts are connected to the root portion by the first connection means or connector for transmission of force from the multiple first bolts to the root portion via the multiple first connection means or connectors, whereby the first connection means or connectors are arranged in a first row along the root portion and each of a multiple of second connection means or connectors is fixedly arranged within the root portion and in a second row along root portion, whereby each of the first connection means or connectors is connected to one or more of the second connection means or connectors, wherein the first row is closer to the root attachment face than the second row.

In the root portion of embodiments of the invention, the compressive stress and loads are distributed among two rows along the root portion and thereby a larger part of the root portion. Thereby, the design options are increased. For example, larger wind turbine blades may be easily manufactured having the root portion according to embodiments of the invention. Further, the possibility of failure is reduced and the service life of the wind turbine blade is increased.

In particular, the first row may run along a first circumference of the root portion and the second row may run along a second circumference of the root portion. The first circumference may be larger than the second circumference.

In particular, the first bolts may have threads on an outer circumference thereof. By these outer threads, they may be interlocked with inner threads of the bolted attachment means. In particular, the multiple first bolts may be arranged in parallel to each other.

The root portion may in particular be a cylindrically shaped root portion of the wind turbine blade. The cross section of the root portion may have a circular or an elliptical shape.

The root portion may be manufactured from a fiber composite material, in particular a fiber composite lay-up. The fiber composite material may have glass fibers and/or carbon fibers, for example.

The multiple first bolts may be secured against the bearing or the hub flange by nuts. This is a particularly simple and easy way of securing the bearing or hub flange to the root portion.

The first connection means or connectors and/or the second connection means or connectors have a cylindrical shape. The load distribution from the first connection means or connectors and/or the second connection means or connectors onto the root portion is optimized by the cylindrical shape.

Also, the first connection means or connectors are bushings and/or threaded inserts. The first bolts may be driven into the bushings and threaded inserts and thereby particularly easy connected with these.

Also, each of the first connection means or connectors is connected to one of the second connection means or connectors by one of the multiple first bolts. Thereby, a stable connection for distributing the force acting upon the first bolts to the second connection means or connectors may be achieved.

Alternatively, each of the first connection means or connectors is connected to one of the second connection means or connectors by two flange plates and/or two second bolts. The two flange plates and/or the two second bolts may be arranged at opposing longitudinal sides of the first connection means or connectors and second connection means or connectors. The two flange plates and/or the two second bolts may be arranged outside of the root portion. Thereby, the distribution of force to the second connection means or connectors may be improved.

Therein, the second connection means or connectors are third bolts connecting the two flange plates with each other. The third bolts may be through bolts extending through the two flange plates. Thereby, the manufacturing of the root portion is simplified and an improved stress distribution is achieved.

Also, each of the first connection means or connectors is connected to one of the second connection means or connectors outside of the root portion. In particular, the two flange plates and/or the two second bolts may be located outside of the root portion. Thereby, the first connection means or connectors and the second connection means or connectors may be easily connected with each other after inserting the first bolts, the first connection means or connectors and the second connection means or connectors in the root portion.

Also, that each of the first connection means or connectors and the second connection means or connectors are connected with each other by a fourth bolt, wherein the fourth bolt is arranged as an adjustable bolt such that a tension between the first connection means or connectors and the second connection means or connectors may be adjusted by the fourth bolt. Thereby, the shear strain distribution within the root portion may be adjusted by the adjustable bolt.

Also, that the first connection means or connectors and the second connection means or connectors are connected with each other in a zig-zag form. The zig-zag form may be provided by bolts, studs or similar connecting the first connection means or connectors with the second connection means or connectors. Thereby, the distribution of force between the first connection means or connectors and the second connection means or connectors may be facilitated.

Additionally, that each of a third connection means or connectors is fixedly arranged within the root portion and in a third row along a circumference of the root portion, whereby each of the second connection means or connectors is connected to one of the third connection means or connectors. Further, a fourth row, fifth row and so on with corresponding connection means or connectors may be provided. Thereby, the shear strain may be distributed among a larger portion of the root portion of the wind turbine blade, whereby detrimental local shear strains are reduced.

According to a second aspect of embodiments of the invention, the aspect is solved by a wind turbine blade comprising the root portion according to the first aspect of embodiments of the invention.

According to a third aspect of embodiments of the invention, the aspect is solved by a root assembly comprising the wind turbine blade according to the second aspect of embodiments of the invention and the bearing or the hub flange, whereby the bearing or the hub flange is connected to the root portion by the multiple first bolts. The bearing or hub flange may be secured against the root portion by attaching nuts to the first bolts.

According to a fourth aspect of embodiments of the invention, the aspect is solved by a wind turbine comprising at least one wind turbine blade according to the third aspect of embodiments of the invention.

BRIEF DESCRIPTION

Some of the embodiments will be described in detail, with references to the following Figures, wherein like designations denote like members, wherein.

DETAILED DESCRIPTION

Figure 1:
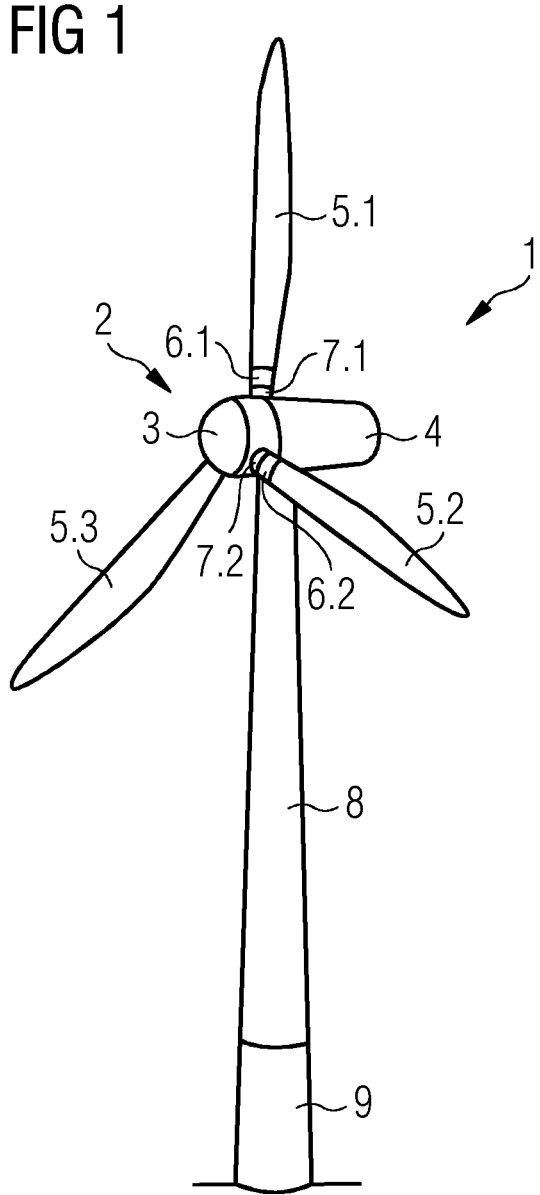
FIG. 1 shows a side perspective view on a wind turbine.

FIG. 1 shows a wind turbine 1 according to an embodiment of the invention. The wind turbine 1 comprises a rotor 2 having three wind turbine blades 5.1, 5.2, 5.3 connected to a hub 3. However, the number of wind turbine blades 5 may be at least one wind turbine blade 5, two wind turbine blades 5 or more than three wind turbine blades 5 and chosen as required for a certain setup of a wind turbine 1.

The hub 3 is connected to a generator (not shown) arranged inside a nacelle 4. During operation of the wind turbine 1, the wind turbine blades 5 are driven by wind to rotate and the wind's kinetic energy is converted into electrical energy by the generator in the nacelle 4.

The nacelle 4 is arranged at the upper end of a tower 8 of the wind turbine 1. The tower 8 is erected on a foundation 9 such as a monopile or tripile. The foundation 9 is connected to and/or driven into the ground or seabed.

Each of the wind turbine blades 5.1, 5.2, 5.3 has a root portion 6.1, 6.2. These root portions 6.1, 6.2 are connected to the hub 3 by bearings 7.1, 7.2 or hub flanges 7.1, 7.2. In this particular view, the root portion 6 and bearing 7 or hub flange 7 of the wind turbine blade 5.3 is covered by the hub 3.

Figure 2:
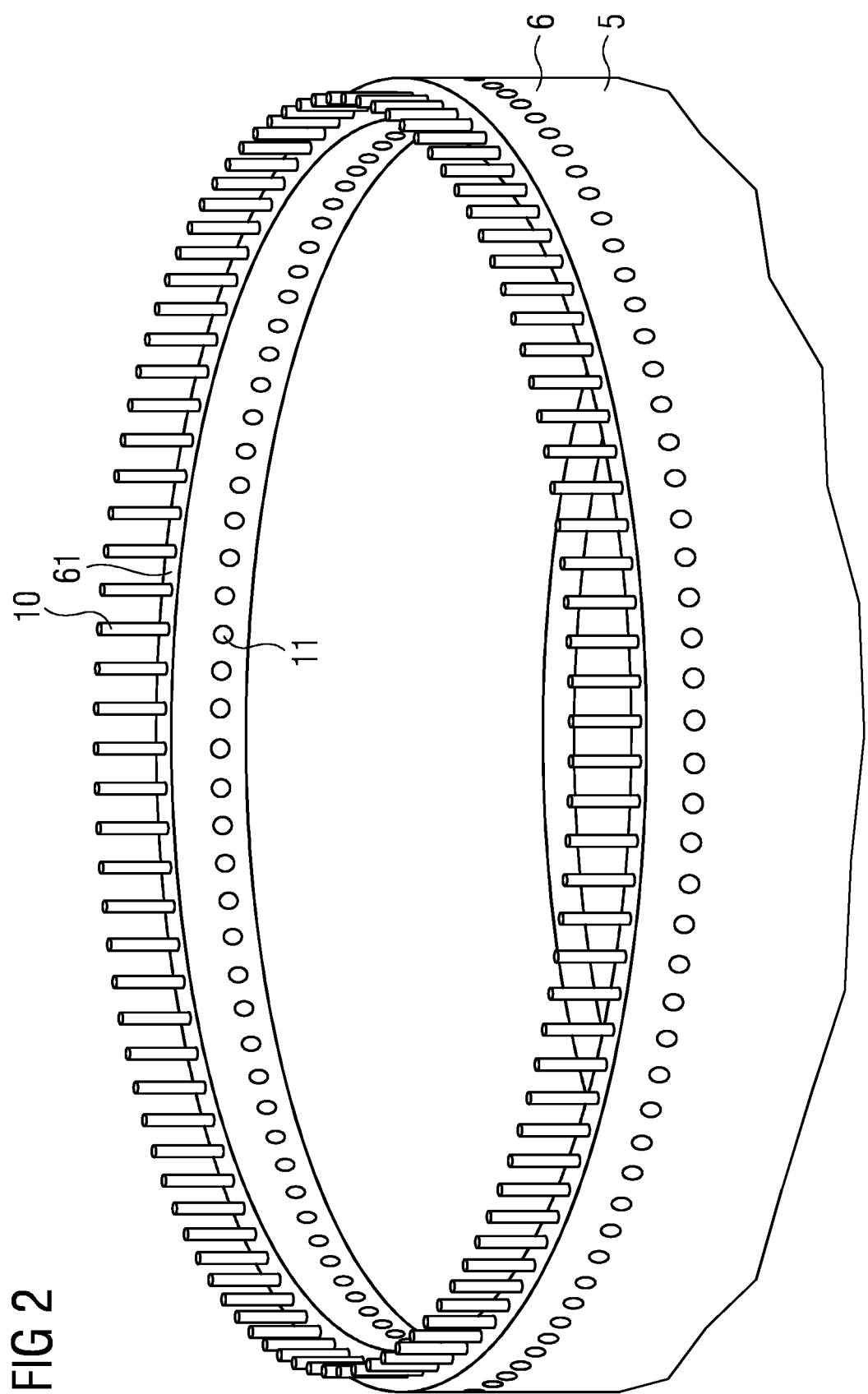
FIG. 2 shows a side perspective view on a root portion of a wind turbine blade according to an embodiment of the state of the art.

FIG. 2 shows a side perspective view on a root portion 6 of a wind turbine blade 5 according to an embodiment of the state of the art.

Multiple connection means or connectors 11 are arranged in a row along a circumference of the root portion 6. Bolts 10 are connected to these s 11. A hub flange 7 or bearing 7 as shown in FIG. 1 may be connected to the root attachment face 61 of the root portion 6 by insertion of the bolts 10 into the hub flange 7 or bearing 7 and securing it by a nut, for example.

Figure 3:
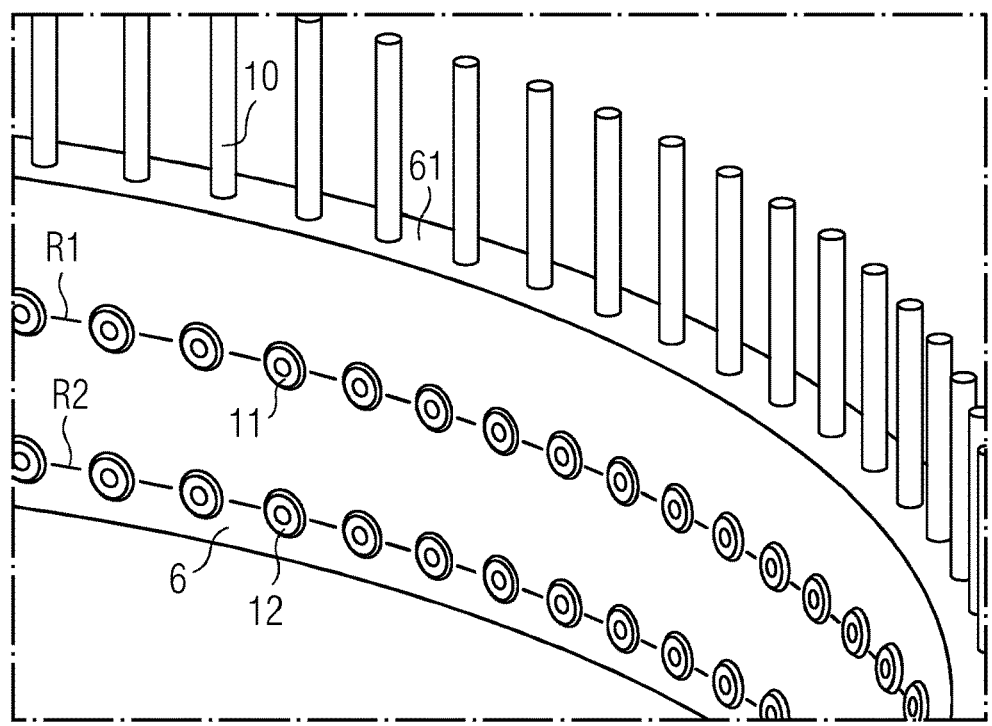
FIG. 3 shows a side perspective view on a part of a root portion of a wind turbine blade according to a first embodiment of the invention.

FIG. 3 shows a side perspective view on a part of a root portion 6 of a wind turbine blade 5 according to a first embodiment of the invention.

Here, multiple first connection means or connectors 11 are fixedly arranged in a first row $R_1$ along a first circumference of the root portion 6 and multiple of second connection means or connectors 12 are fixedly arranged in a second row $R_2$ along a second circumference of the root portion 6. Each of the first connection means or connectors 11 is connected to one of the second connection means or connectors 12 by the first bolt 10 extending through the first connection means or connectors 11 and the second connection means or connectors 12 and outside of the root attachment face 61, wherein the first row $R_1$ is closer to the root attachment face 61 than the second row $R_2$.

By providing the connection means or connectors 11, 12 in two separate rows $R_1$, $R_2$, the compressive strain occurring when securing the bearing 7 or hub flange 7 against the root portion 6 and the loads occurring during operation of the wind turbine 1 are distributed over a larger part of the root portion 6. Thereby, compared to the root portion 6 of FIG. 2, the root portion 6 of FIG. 3 has more design options, greater service life, further optimization and is less susceptible to failure.

In this embodiment, the first connection means or connectors 11 and the second connection means or connectors 12 are designed as bushings having internal threading for receiving the first bolts 10 with their external threading. Both, the first connection means or connectors 11 and the second connection means or connectors 12 have a cylindrical shape optimizing the distribution of load to the cavities in which they are inserted.

Figure 4:
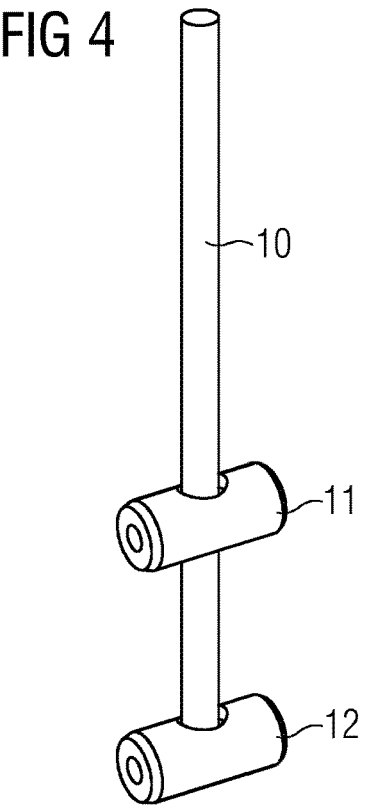
FIG. 4 shows a side perspective view on a connection part of the root portion of FIG. 3.

FIG. 4 shows a side perspective view on a connection part having the first bolt 10 and the thereto connected first connection mean 11 and the second connection mean 12 as inserted into the root portion 6 of FIG. 3. The first connection means or connectors 11 and the second connection means or connectors 12 are parallel to each other with their longitudinal extension.

Figure 5:
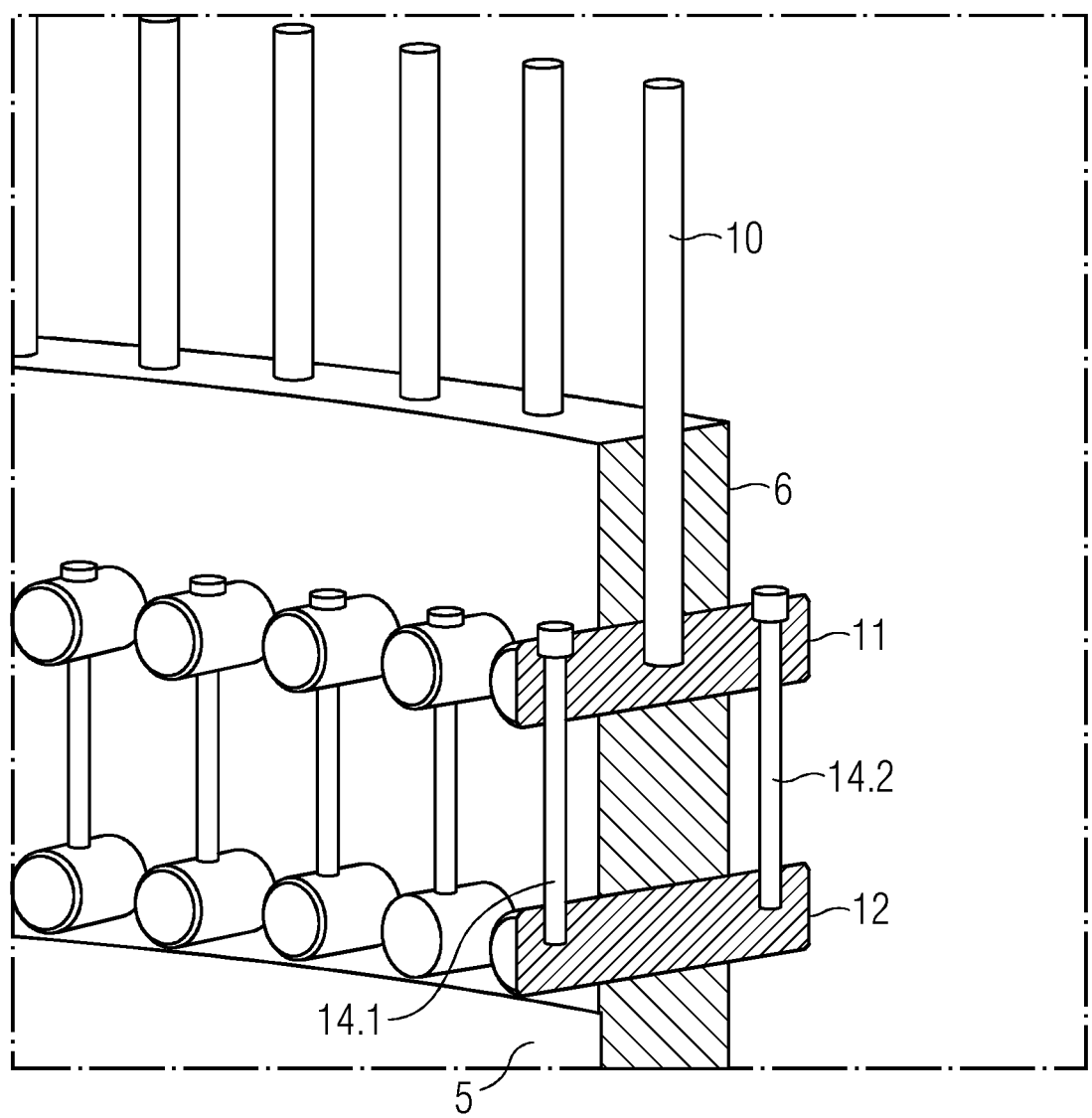
FIG. 5 shows a partial view on a part of a root portion of a wind turbine blade according to a second embodiment of the invention.

FIG. 5 shows a partial view on a part of a root portion 6 of a wind turbine blade 5 according to a second embodiment of the invention where first connection means or connectors 11 and the second connection means or connectors 12 are only connected by second bolts 14.1, 14.2.

In this second embodiment, the first connection means or connectors 11 and the second connection means or connectors 12 are in addition to the first bolt 10 connected by second bolts 14.1, 14.2. The first connection means or connectors 11 and the second connection means or connectors 12 extend with their two ends outside of the root portion 6. The second bolts 14.1, 14.2 are attached to end portions of the first connection means or connectors 11 and the second connection means or connectors 12 outside of the root portion 6.

Figure 6:
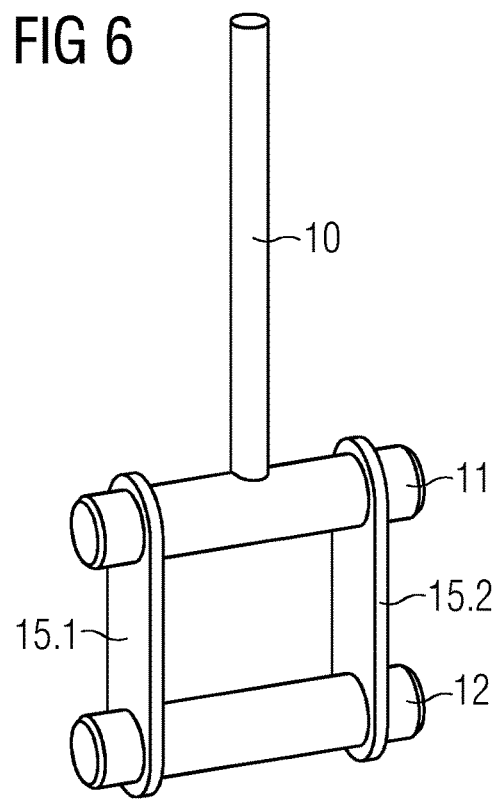
FIG. 6 shows a side perspective view on an alternative connection part for the root portion of FIG. 5.

FIG. 6 shows a side perspective view on an alternative connection part for the root portion 6 of FIG. 5. Instead of second bolts 14, flange plates 15.1, 15.2 are connecting the first connection means or connectors 11 with the second connection means or connectors 12. The flange plates 15.1, 15.2 may also be located outside of the root portion 6 itself. Further, the first connection means or connectors 11 and the second connection means or connectors 12 may comprise circumferential grooves for attaching the flange plates 15.1, 15.2 thereto.

Figure 7:
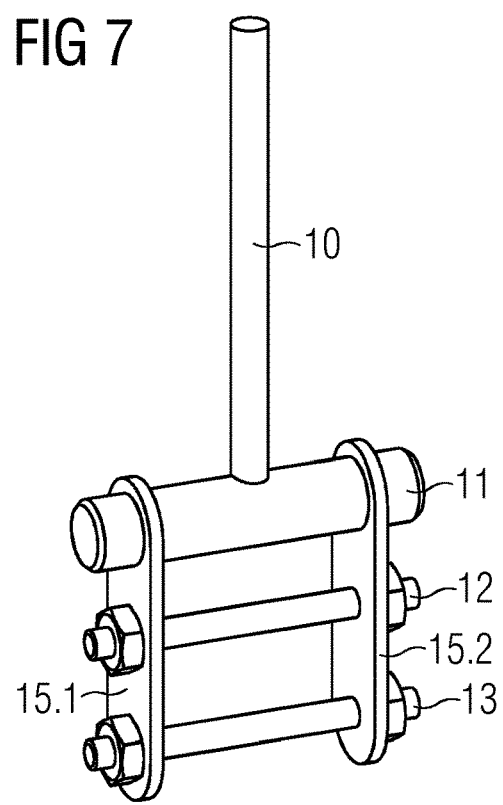
FIG. 7 shows a side perspective view on a further alternative connection part for the root portion of FIG. 5.

FIG. 7 shows a side perspective view on a further alternative connection part for the root portion 6 of FIG. 5. Here, the first connection means or connectors 11 is connected with a second connection means or connectors 12 and a third connection means or connectors 13 by two flange plates 15.1, 15.2. The first connection means or connectors 11 is designed as a bushing, whereas the second connection means or connectors 12 and the third connection means or connectors 13 are designed as third bolts, in particular as through bolts. The particular number of through bolts used is not limited to two, but any number and shape may be provided.

Figure 8:
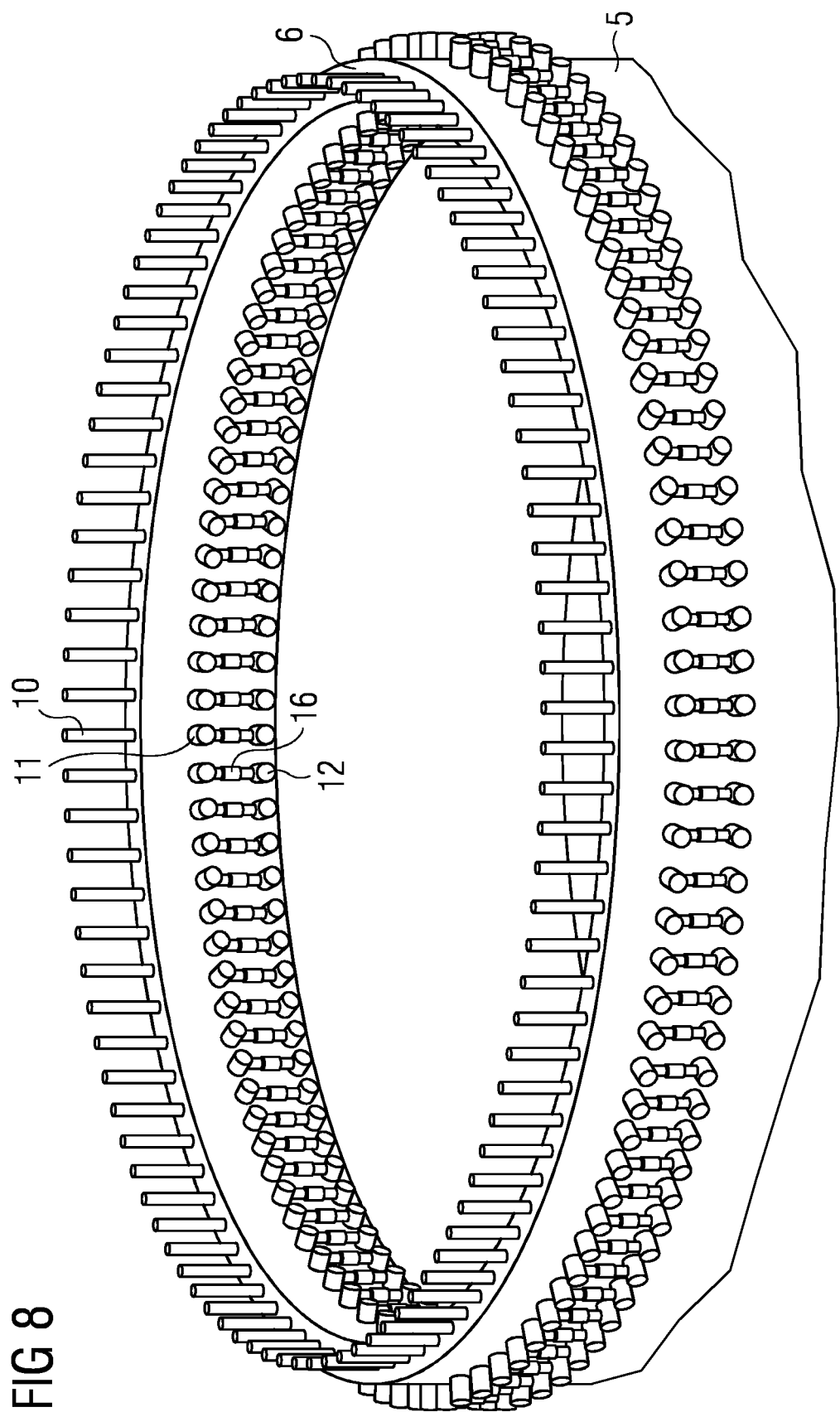
FIG. 8 shows a side perspective view on a part of a root portion according to a third embodiment of the invention.

FIG. 8 shows a side perspective view on a part of a root portion 6 according to a third embodiment of the invention. Here, the first connection means or connectors 11 and the second connection means or connectors 12 are connected with each other by fourth bolts. The fourth bolts are arranged as adjustable bolts such that a tension between the first connection means or connectors 11 and the second connection means or connectors 12 may be adjusted by the fourth bolt 16.

Figure 9:
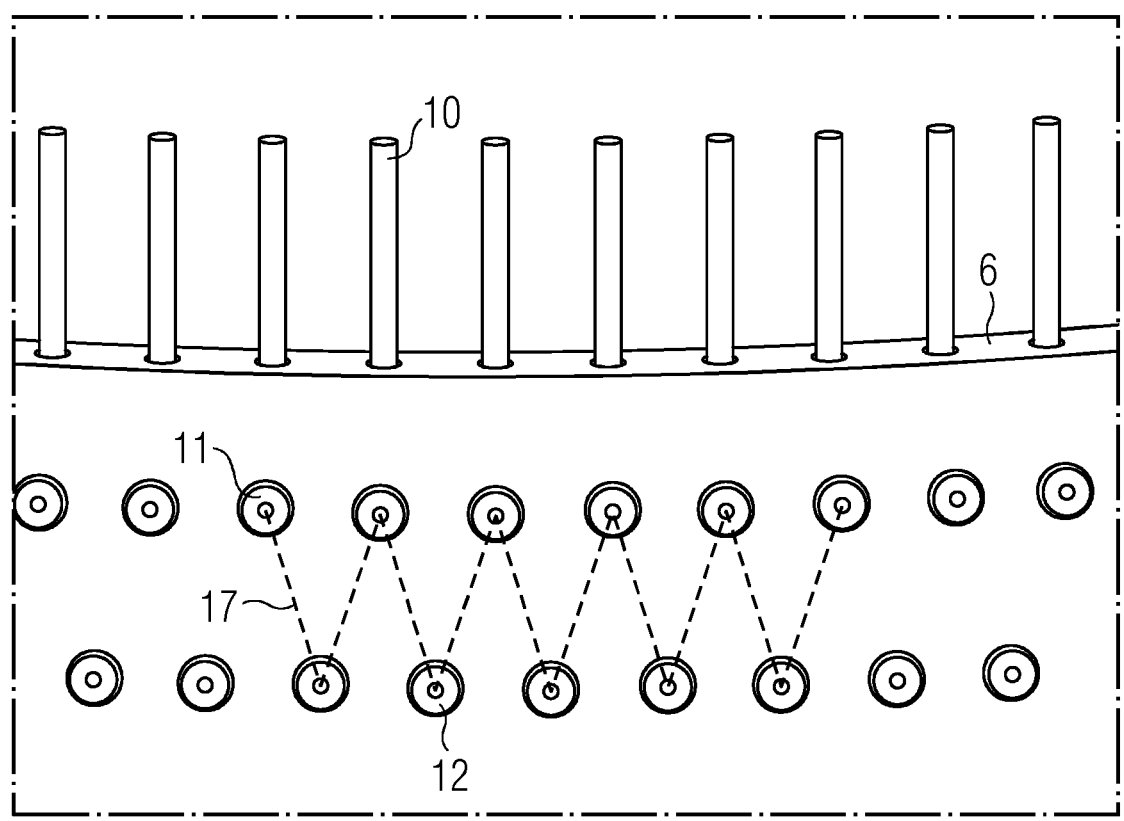
FIG. 9 shows a front view on a part of a root portion according to a fourth embodiment of the invention.

FIG. 9 shows a front view on a part of a root portion 6 according to a fourth embodiment of the invention. Here, the first connection means or connectors 11 and the second connection means or connectors 12 are connected with each other in a zig-zag form. Further, the zig-zag form may be used with the embodiments of the invention having the flange plates 15, fourth bolts 16 or other, for example.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A root portion of a wind turbine blade for a wind turbine, wherein the root portion comprises multiple first bolts arranged within the root portion and extending out of a root attachment face of the root portion for attachment of the root attachment face to a bearing or a hub flange, and wherein the root portion comprises multiple first connection means or first connectors fixedly arranged within the root portion, wherein the multiple first bolts are connected to the root portion by the first connection means or the first connectors for transmission of force from the multiple first bolts to the root portion via the multiple first connection means or connectors, wherein the first connection means or connectors are arranged in a first row along the root portion and each of a multiple of second connection means or connectors is fixedly arranged within the root portion and in a second row along root portion, wherein each of the first connection means or connectors is connected to one or more of the second connection means or connectors, wherein the first row is closer to the root attachment face than the second row, wherein at least one of the first connection means or connectors is connected to one of the second connection means or connectors by two flange plates arranged outside of the root portion and/or two second bolts arranged outside of the root portion, or wherein at least one of the first connection means or connectors and one of the second connection means or connectors are connected with each other by a fourth bolt arranged outside of the root portion, wherein the fourth bolt is arranged as an adjustable bolt such that a tension between the at least one first connection means or connectors and the second connection means or connectors may be adjusted by the fourth bolt.

2. The root portion according to claim 1, wherein the first connection means or connectors and/or the second connection means or connectors have a cylindrical shape.

3. The root portion according to claim 1, wherein the first connection means or connectors are bushings and/or threaded inserts.

4. The root portion according to claim 1, wherein the second connection means or connectors are third bolts connecting the two flange plates with each other.

5. The root portion according to claim 1, wherein the first connection means or connectors and the second connection means or connectors are connected with each other in a zig-zag form.

6. The root portion according to claim 1, further comprising a plurality of third connection means or connectors, wherein each of the third connection means or connectors is fixedly arranged within the root portion and in a third row along a circumference of the root portion, wherein each of the second connection means or connectors is connected to one of the third connection means or connectors.

7. A wind turbine blade comprising the root portion according to claim 1.

8. A root assembly comprising the wind turbine blade according to claim 7 and the bearing or the hub flange, wherein the bearing or the hub flange is connected to the root portion by the multiple first bolts.

9. A wind turbine comprising at least one root assembly according to claim 8.

* * * * *